United States Patent [19]

Persson

[11] 3,980,250

[45] Sept. 14, 1976

[54] DEVICE FOR HOLDING TUBE SHAPED OBJECTS

[76] Inventor: Leif Persson, Harley Bank South, Victoria Road, Todmorden, Lancs, England

[22] Filed: Mar. 13, 1975

[21] Appl. No.: 557,981

[30] Foreign Application Priority Data

Mar. 19, 1974 Sweden ............................ 7403651
Nov. 12, 1974 Sweden ............................ 7414160

[52] U.S. Cl. .......................... 242/129.5; 242/110.1; 269/48.1; 279/4
[51] Int. Cl.² .................... B65H 49/00; D01H 7/16; B65H 75/24
[58] Field of Search ........... 242/129.5, 129.7, 130.2, 242/110, 110.2, 72 B; 269/47, 48.1, 25, 35; 279/4, 106, 110, 2

[56] References Cited
UNITED STATES PATENTS

| | | |
|---|---|---|
| 2,678,175 | 5/1954 | Wiig ............................... 242/110.2 |
| 3,022,024 | 2/1962 | Tishken .......................... 242/110.1 |
| 3,223,341 | 12/1965 | Gadde .............................. 242/72 B |
| 3,326,495 | 6/1967 | DeBruyn ............................ 242/129 |
| 3,388,916 | 6/1968 | Winnen et al. .................... 269/48.1 |
| 3,599,958 | 8/1971 | Schindler ......................... 269/48.1 |
| 3,762,730 | 10/1973 | Cameron ............................... 274/4 |
| 3,830,509 | 8/1974 | Weber .................................. 279/2 |
| 3,908,926 | 9/1975 | Ochs et al. ....................... 242/72 B |

*Primary Examiner*—Leonard D. Christian
*Attorney, Agent, or Firm*—Ulle C. Linton

[57] ABSTRACT

A device for holding tube-shaped objects which objects are placed on or off a casing having a fixed portion, a slideable portion, and expandible members connecting said casing fixed and slideable portions, a piston inside said casing connected to said slideable portion and valves for controlling the supply of a pressure medium to said piston through the movement of the object on said casing so that said object can be held on said casing or readily removed therefrom by a longitudinal movement of said object.

23 Claims, 8 Drawing Figures

DEVICE FOR HOLDING TUBE SHAPED OBJECTS

SERVICE

It is a principal object of the present invention to provide a holder for tube shaped objects, which holder without any special procedure of adjustment can be adapted to highly varying dimensions and shapes of objects, by way of example the core of yarn bobbins, in order to obtain a reliable hold on them.

Said object is reached by a device designed in accordance with the present invention, substantially being characterized by comprising one or several parts, which can expand and contract in sidewise direction, when the tube shaped object is thread on the device and removed from the same respectively.

Figure 1:
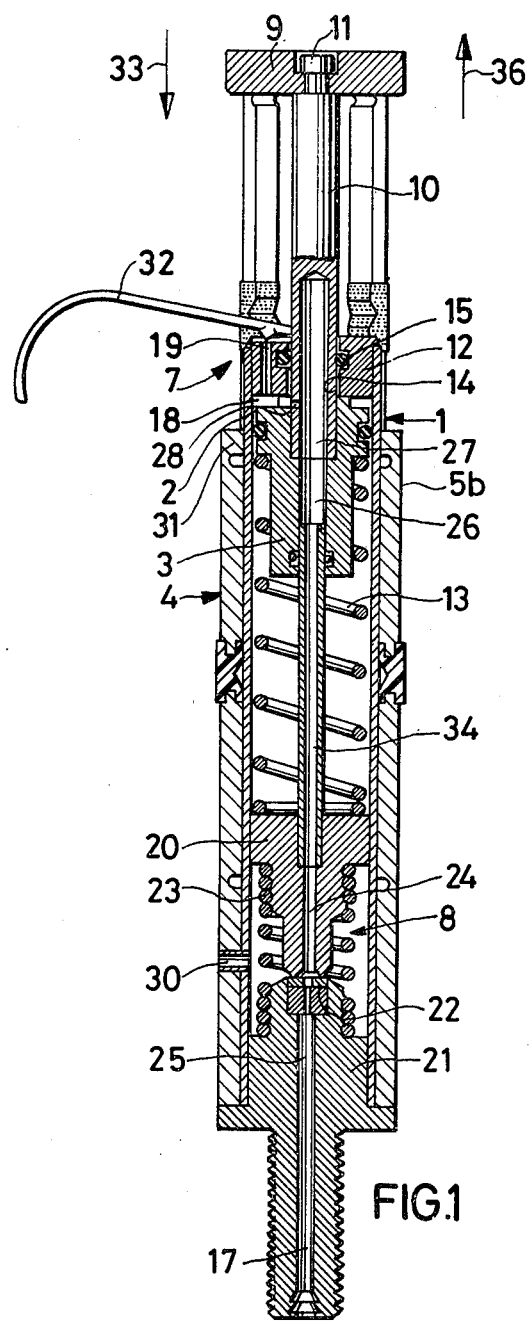
Figure 2:
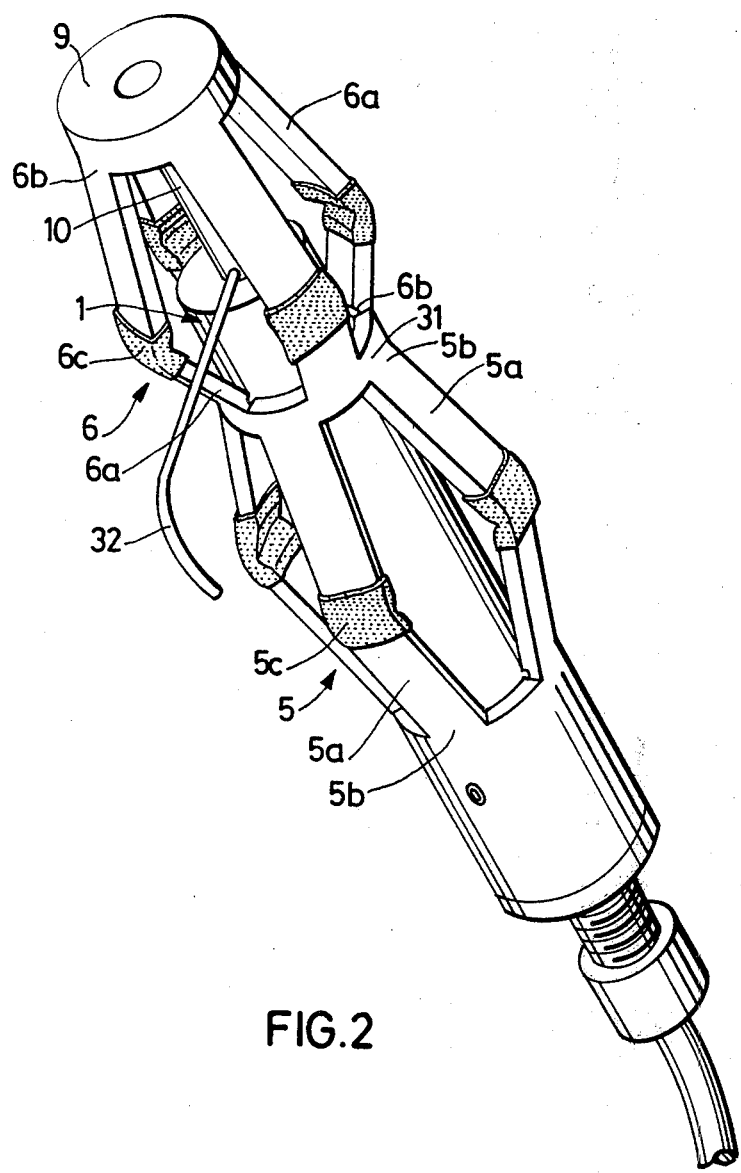
Figure 3:
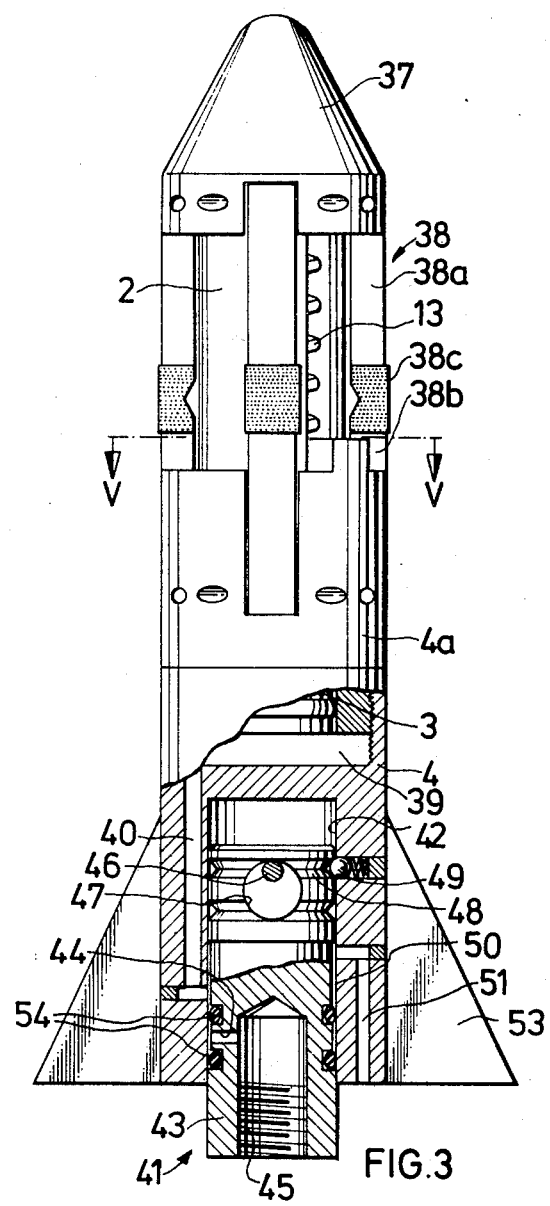
Figure 4:
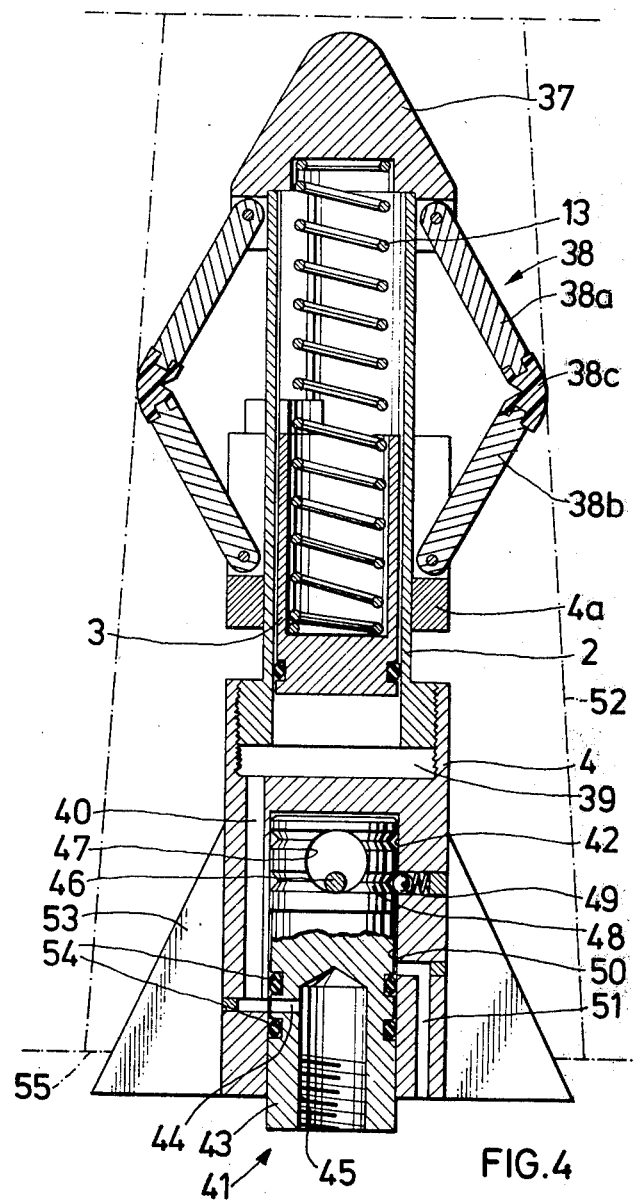
Figure 5:
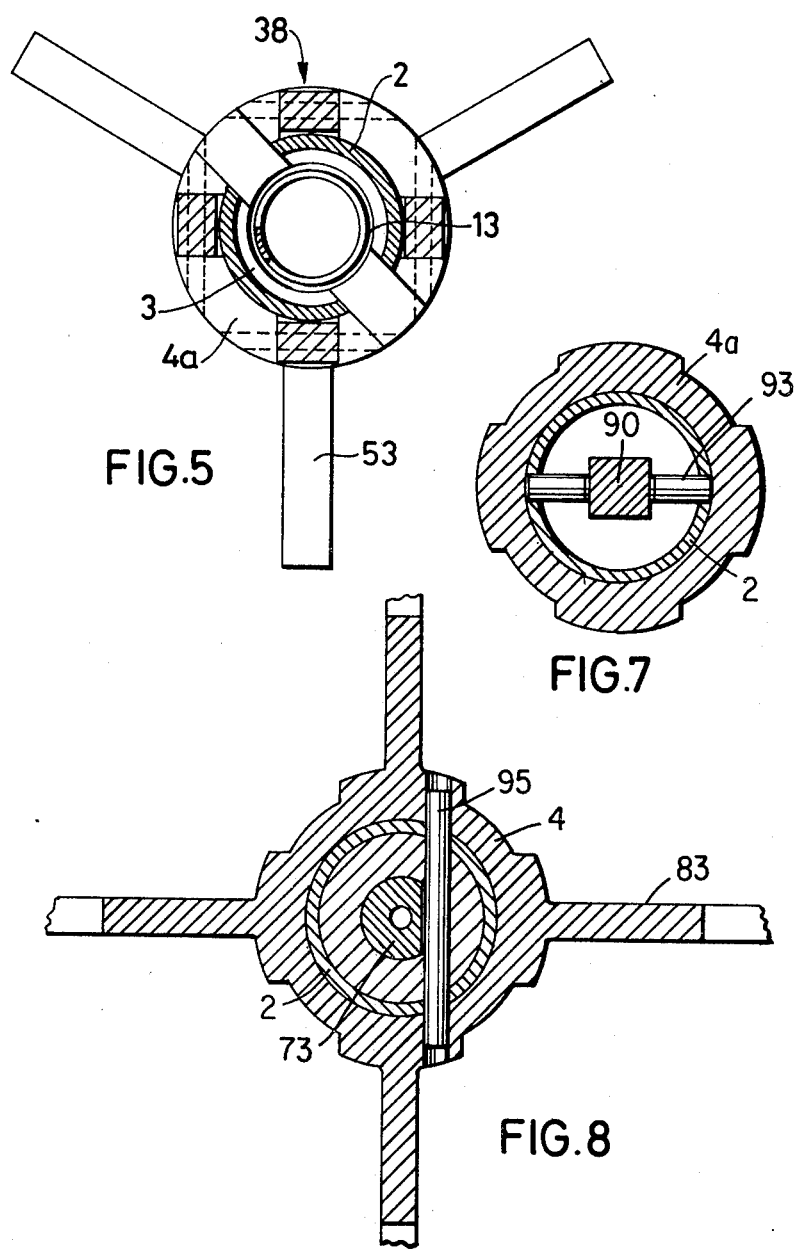
Figure 6:
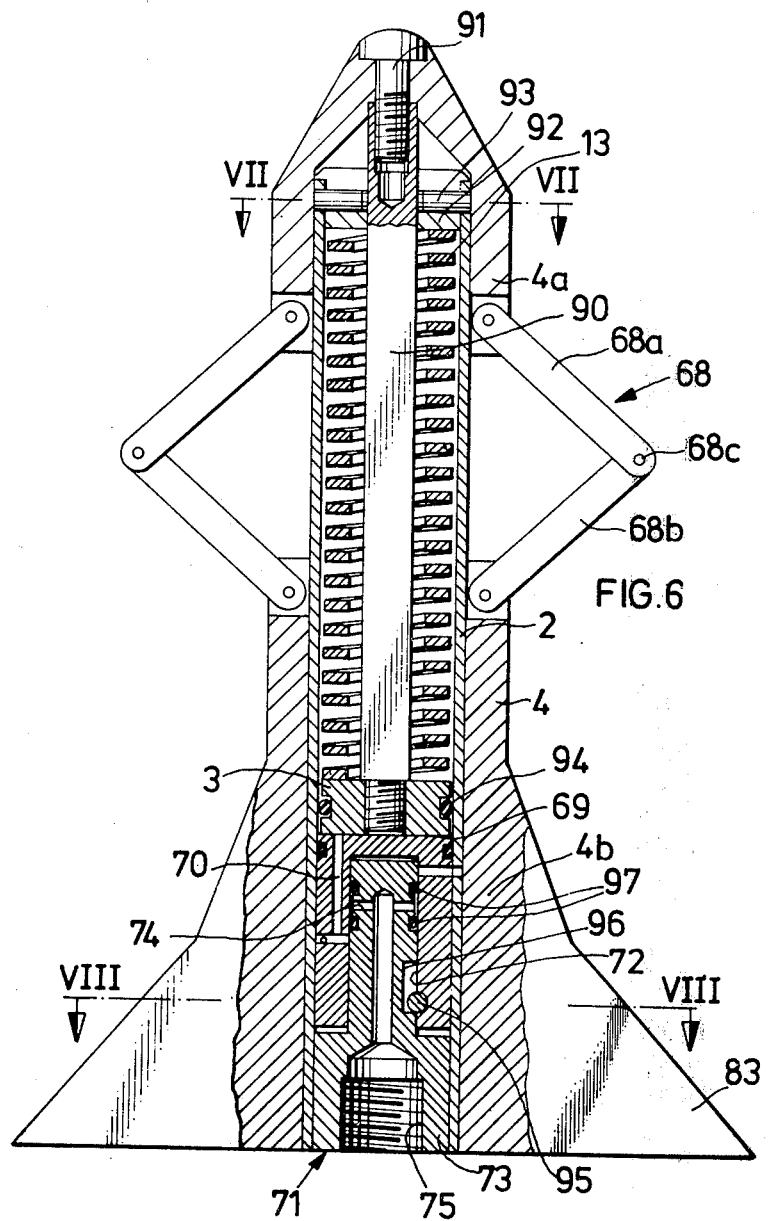

An example of embodiment of the object of the invention will now be described, reference being made to the accompanying drawings, in which:

FIG. 1 is a longitudinal cross sectional view of a first example of embodiment of a holder according to the invention, FIG. 2 is a prespective view of the same holder, FIG. 3 illustrates in a partly broken side elevational view a holder according to a second example of embodiment of the object of the invention seen in contracted condition thereof, FIG. 4 is a longitudinal cross sectional view of the same device in expanded condition, FIG. 5 is a cross sectional view of the last mentioned device along the line V—V of FIG. 3, FIG. 6 is a view corresponding the one in FIG. 4 and illustrating a longitudinal cross section of a device according to a third example of embodiment, FIG. 7 is a cross sectional view of the device according to FIG. 6 along the line VII—VII of said figure, and FIG. 8 shows a cross section of the same device along the line VIII—VIII of FIG. 6.

The holder illustrated in the FIGS. 1 and 2 substantially comprises a power unit 1, in the assembly of which there is a cylinder 2 enclosing a displaceable piston 3, a casing 4 surrounding said power unit being connected therewith at its top and bottom respectively. The power unit 1 is designed in such a manner that its length can be varied in order to actuate two expanding portions 5, 6 of the casing 4. The holder further comprises control means in the form of two valve units 7, 8 by means of which the power unit 1 can be controlled in such a manner that both the expanding portions can expand, when an object, which the holder is intended to hold, is threaded on, and contract, when said object is taken off.

The piston, which can be displaced in the cylinder 2, is rigidly connected with one end portion 9 of the casing 4 by means of a piston rod 10, which extends inside the casing and by means of a bolt 11 is fastened to the same. In the end position shown the piston 3 is pressed against one of the end walls 12 of the cylinder 2 under the bias of a pressure spring 13 mounted on one side of the piston, the piston rod extending through a bore 14 in the one of the end walls of the cylinder, in which the rod is displaceable and sealed by means of an O-ring 15.

The movement of the piston 3 against the bias of the pressure spring 13 in order to expand the casing 4 in the example illustrated is brought about pneumatically, and therefore the power unit 1 with an input 17 is connected to a source of compressed air not shown. Said movement of the piston 3 is brought about by application of a pressure by means of compressed air on the side of the piston facing the end wall 12, in the following denominated the other side of the piston, due to the space 18 formed between the piston and the end wall being in communication with the source of compressed air. With respect to the control means the first valve unit 7 is located in the end wall 12 and arranged to close a port 19 from said space 18 in the cylinder 2 leading to the atmosphere, when the object is threaded on the device. The second valve unit 8 on the other hand is arranged to open a communication between the space 18 and the atmosphere, when the object is removed. This valve unit 8 comprises a valvebody 20 located in the cylinder 2, which valvebody is undisplaceable in said cylinder 2, and a valve seat 22 located in the other end portion 21 of the holding device. By means of a tension spring 23, which is screwed on the threads of the valvebody 20 as well as on the threads of the valve seat 22, the valvebody is kept in a tight fit to the valve seat in the position illustrated in FIG. 1. Moreover the valvebody 20 and the valve seat 22 are provided with a through bore 24, 25 for air, which bore is in communication with the input 17. The air channels 24, 25 also communicate with the space 18 on the other side of the piston 3 via a tube 25 rigidly connected with the valvebody and extending into a through bore 26 of the piston, being displaceable in said bore. The bore 26 passes to a bore 27 in the piston rod 10, which at the level of the space 18 is provided with a cross channel 28, by means of which the bore in the piston rod is in communication with the space 18 located on said other side of the piston, whereby this space thus communicates with the source of compressed air. Said other end portion 21 of the holder is shaped with an annular stop collar and is somewhat displaceable with the valve seat 22 relative to the other part of the holder, whereby the communication between the space 18 on said other side of the piston and the atmosphere is opened up by a longitudinal displacement of the casing 4 relative to the end portion 21, the valve unit to this effect being provided with a discharge port 30.

As is clearly evident from the FIG. 2 the expanding portins 5, 6 of the casing 4 comprise in between them laterally spaced long wall portions 5a, 6a distributed round the periphery, which portions overbridge the distance between the non-expanding wall portions of the casing. Each one of the wall portions 5a, 6a is provided with three links, of which two outer links 5b, 6b are shaped by a bending notch in the casing and an intermediate link 5c, 6c is comprised by an element of for example rubber, which has a comparatively short extension in the longitudinal direction of the holder. Other parts of the wall portions 5, 6 are comparatively stiff, whereby at an expanding movement a toggle-joint-like outwards bending of the expanding portions 5, 6 is obtained. By choosing a material of high friction for the interspaced links 5c, 6c they serve the purpose of friction pads, which bearing against the inner wall of a tube shaped object make possible a good hold thereof. Between the two expanding portions, 5, 6 there is a neck portion 31, which is displaceable relative to the cylinder 2. Between two of the wall portions 6a in one of the expanding parts 6 a flexible operating handle 32 is extending outside of the casing and serving the purpose of actuating the valve unit 7.

When an object is threaded on, in order to be held by the holder according to the invention, said object is threaded over the casing 4 in the direction of the arrow 33 of FIG. 1. Thereby the flexible operating handle 32 is bent downwards, which results in a closure of the exhaust port 19 by means of the valve unit 7 being actuated by the operating handle, said valve unit in opened up condition letting out compressed air, which continously flows through the holding device from the source of compressed air through the inlet 17, the air channels 25, 24 the tube 34, the bores 26, 27 in the piston 3 and the piston rod 10, the cross channel 28 and the space 18 on the other side of said piston. When the valve unit 7 shuts off the exhaust port 19, a rise of the pressure in the space 18 in the cylinder 2 takes place, whereby a pressure is applied to the other side of the piston 3 of such force that it exceeds the counter pressure exercised upon by the pressure spring 13 on said first side of the piston. Thus the piston consequently against bias of the pressure spring 13 is displaced in downwards direction together with one end portion 9 of the casing 4 because of said end portion being rigidly connected with the piston via the piston rod 10. As a result the casing is compressed along its longitudinal extension, whereby the the expanding portions 5, 6 in a toggle-joint-like manner are bent outwards in their links 5b, 6b, 5c, 6c. The lower expanding portion 5 according to FIG. 1 is bent outwards because of the downwards displacement of the neck portion 31 of the casing 4 along the cylinder 2, when the casing is contracting due to the pressure applied. The outwards bend of the two portions 5, 6 is automatically adapted to the shape and dimensions of the object because of the fact that the object has been threaded on before any substantial bending out has been initiated on account of the short delay caused by the increase of pressure. In firmly held condition of the object thus the friction pads 5c, 6c also serving the purpose of links are pressed against the inside of the object by the force of the compressed air operating upon the other side of said piston 3. When the object is going to be removed, it is pulled slightly in upwards direction, which is the direction of the arrow 36 according to FIG. 1, whereby the casing 4 with the cylinder is somewhat displaced relative to end portion 21 rigidly mounted on a stand or similar, which brings in its train that the valvebody 20, which cannot be displaced relative to the casing, is lifted against bias of the tension spring 23 a short distance in upwards direction from the valve seat 22. Hereby a communication between the space 18 on said other side of the piston 3 and the atmosphere via the exhaust port 30 is established, whereby the airpressure in the space 18 declines to the pressure of the surrounding atmosphere resulting in a reduction of the force of the pressure operating upon the piston, causing said piston to be displaced in upwards direction in the cylinder 2 under the bias of the pressure spring 13. The power unit 1 is thereby again prolonged, which brings in its train that the expanding portions 5, 6 are contracting and the holding device according to the invention occupies the position illustrated in FIG. 1, in which the object easily can be taken off. The power unit can of course also be of another type than the one illustrated in the FIGS. 1 and 2. It is of course also within the scope of the invention to design the power unit to be mechanically or hydraulically driven. Moreover the valve units 7, 8 can be operated in another manner than the one illustrated, for example by means of push buttons or similar. In the FIGS. 1 and 2 two expanding portions 5, 6 have been shown, but the holder can exhibit one expanding portion only or several expanding portions without departing from the fundamental idea of the invention.

The holder illustrated in the FIGS. 3–5 substantially comprises a cylindric casing 4 enclosing a cylinder, in which a piston 3 is arranged, which can perform a reciprocating movement. The piston 3 is connected with a portion 4a of the casing, which is displaceable in the longitudinal direction, said displacement causing expansion and contraction respectively of an expanding portion 38 located between the casing portion 4a and the free end portion 37 of the device. In the example of embodiment shown this expanding portion 38 comprises four symmetrically arranged and comparatively stiff pair of links 38a, 38b hinged to the casing portion 4a and the end portion 37, said link pairs exhibiting each one its interjacent toggle link 38c in the shape of a friction pad.

In the cylinder 2, which in the example of embodiment shown is of single acting type, a pressure spring is inserted between the end portion 37 and the piston 3 at one side of the latter one, while on the other side of the piston the interior of the cylinder exhibits an enclosed space 39 intended to be put under pressure by means of a pressure medium. A channel 40 leads to said space 39, which channel alternatively can be brought into communication with a source of pressurized medium not shown or with the atmosphere by changing over a valve unit 41 enclosed in the casing 4 of the device.

The valve unit 41 comprises a valvebody 43, along its longitudinal axis movable in a hollow space 42 enclosed by the casing 4, said valvebody exhibiting an interconnecting channel 44 debouching into the lateral wall of the valvebody and extending crosswise to the abovementioned longitudinal axis, which channel via an inner bore 45 is in communication with the source of the pressure medium. The valvebody is movable between two positions, which are illustrated in FIG. 3 and FIG. 4 respectively, and the extension of its movement is limited by a pin 46 inserted into a bore in the cylinder wall at right angle to said wall.

The pin 46 extends into a bore 47 arranged in the valvebody 43 likewise exhibiting a crosswise direction at right angle to the longitudinal axis of the valvebody, the wall of said bore 47 during the longitudinal displacement of the valvebody 43 coming to a stop against the pin 46. The valvebody is further provided with two annular grooves 48 in order to take up a spring loaded ball 49, by which arrangement distinct snapping in positions are obtained for the valvebody. This is further dimensioned in such a manner that a ring-shaped channel 50 of communication is obtained between the valve 43 and the hollow space 42 in the casing 4, whereby a communication with the atmosphere via an outlet channel 51 for letting out the pressure medium is made possible, which makes air a suitable medium for the purpose in question. It is further evident from the FIGS. 3–5 that one end of the device is provided with a centering stop for the movable objects 52, which the device according to the invention is intended to hold, which quite schematically is hinted with dashed and dotted lines in FIG. 4. The stops comprise three fins 53 projecting from the casing 4.

The holder according to the invention is rigidly mounted with its valvebody 43 connected with a stand or similar (not shown) and occupies the contracted position illustrated in FIG. 1, when the object is removed, in which condition the valvebody 43 is in the position, in which the valvebody is displaced in such a way that the orifice of the crosswise directed channel 44 of communication in the valvebody is sidewise displaced relative to the orifice of the channel 40 leading from the space 39 in the cylinder, whereby the communication between said space 39 and the source of pressure medium is kept interrupted. For this purpose two O-rings 54 are arranged in the valvebody 43 on each side of the crosswise directed channel 44 of communication, by means of which rings a complete seal against escaping air is secured. When threading on the tube shaped object 52, which is going to be held by the device according to the invention, the end surface 55 of said object will arrive in a position, in which it strikes against the stop of the holder, at the same time as the latter one is displaced in such a manner that the valvebody is brought to occupy the position illustrated in FIG. 2. The source of pressure medium via the crosswise directed channel 44 and the channel 40 is then brought into communication with the space 39 in the cylinder 2, which results in pressure being applied to one side of the piston 3, said pressure being of such magnitude that the piston is displaced against the bias of the pressure spring 13, whereby the expanding portion in the form of the hinged arm pairs 38a, 38b are pivoted in outwards direction until their toggle joints, i.e. the friction pads 38c, will arrive in a position, where they bear against the inner wall of the tube shaped object 52 and the object is firmly held and well centered round the longitudinal axis of the holder on account of on one hand the gradually increasing force of the pressure during the pivoting movement in outwards direction of the hinged arm pairs and the friction at the contact surface between the friction pads and the inner wall of the object, and on the other hand the totally synchronized pivoting out movement of the four hinged arm pairs.

When it is desired to remove the object 52 from the holder, one grips it with a lifting movement, whereby the holder follows along a short distance so that the valvebody 43 is displaced to the position illustrated in FIG. 3, in which, as mentioned above, the communication is interrupted between the source of the pressure medium and the space 39 in the cylinder 2. At the same time the communication between the space 39 and the atmosphere via the channel 40, the ring shaped channel 50 of communication and the out-let channel 51 is opened, whereby the pressure applied in the cylinder is relieved on account of the escape of the pressure medium into the atmosphere. The piston 3 is then displaced downwards in the cylinder 2 under the bias of the pressure spring 13, whereby the expanding portion is contracted due to the inwards pivoting movement of the hinged armpairs to the position illustrated in FIG. 1, the object thus being completely liberated for removal. Thus, the actuation of the valve unit 41 in order to operate the expansion and contraction of the holder takes place with the natural movements required for threading on and removing a tube-shaped object on and from a holder respectively.

One can also imagine that the movement of the piston 3 is produced by alternatively applying a pressure from a pressure medium on one or the other side of the piston in a cylinder, which in such connection is of the double acting type and does not exhibit any pressure spring 13. The pressure spring can also be located on the other side of the piston, the pressure of the pressure medium then being applied on the opposition side of the piston. One can also imagine that the pressure spring is substituted by a tension spring working on the same side as the pressure medium. The device can further be provided with more than one expanding portion, and the valve unit illustrated can be of a different design.

As is the case with the device illustrated in the FIGS. 3–5, the holder shown in the FIGS. 6–8 substantially comprises a casing 4 of cylindric shape and a cylinder 2 enclosed in said casing, in which cylinder a piston 3 can perform a reciprocating movement. The piston 3 is connected with a portion 4a of the casing, which portion is movable in its longitudinal direction. However, in this example of embodiment the movable portion of the casing is located at the free end of the cylinder 2 forming a lid, which close this end of the cylinder. The movable portion 4a of the casig is rigidly connected with the piston 3 via a rod 90 screwed on to the portion 4a of the casing and to the piston 3 respectively. The connection between the lid 4a and the pull rod 90 is secured by means of a bolt 91 screwed in from the end of the lid or cap 4a. One end of a pressure spring 13 rests on the top side of the piston 3, the other end of said spring resting against a supporting washer 92, which in its turn is kept in place in the housing shaped by the cylinder 2 by means of radially extending locking pins 93. The piston 3 is tightened relative to the wall of the cylinder 2 by means of an O-ring 94 laid in an annular groove. As was the case in the preceding example of embodiment, an expanding portion 68 extends between the movable portion 4a of the casing 4 and its fixed portion 4b, said expanding portion comprising comparatively stiff hinged armpairs 68a, 68b, each one with its interjacent toggle joint 68c, which suitably can be designed as a friction pad or be provided with such a pad. At the underside of the piston 3 according to FIG. 3 a hollow space 69 is shaped, which is intended to be put under pressure by means of a pressure medium. A channel 70 leads to the spacce 69, and said channel can alternatively be brought into communication with a source of a pressure medium, not shown, or to the atmosphere by changing over a valve unit 71 enclosed in the casing 4 of the device.

The valve unit 71 comprises a valve body 73 movable in its longitudinal direction in a hollow space 72 enclosed by the casing 4, which valvebody exhibits a connecting channel 74 debouching in the lateral wall of the valvebody and extending crosswise relative to the above mentioned longitudinal direction, said connecting channel via an inner bore 75 being in communication with the source of a pressure medium. The valvebody 73, as was the case with the previously described examples of embodiment, is movable between two positions, which are limited by means of a pin 95 mounted in the surrounding cylinder housing and extending in crosswise direction to the piston, said pin forming a stop against the end walls of a recess 96 made in one side of the piston 73. In the position of the valvebody 73 illustrated in FIG. 6, compressed air enclosed in the space 69 is permitted via the channel 70 and the outside of the piston 73 to flow out into the atmosphere under the bias of the pressure spring 13, which tends to move the piston 3 to the position illustrated in FIG. 6, in which the expanding portion 68 of the casing is brought to expand to bear against the inside of the tube-shaped object, which shall be held in the holder.

The valvebody 73 exhibits two O-rings 97 positioned one on each side of the crosswise extending channel 74, which rings interrupt the air communication via the channel 75 in the position illustrated in FIG. 6. When the object held in the holding device shall be removed, one subjects it to a pull in upwards direction according to the drawing, whereby the valvebody 73 passes to a position, in which the crosswise extending channel 74 gets in communication with the channel 70, whereby compressed air flows into the space 69 from the source of compressed air connected with the channel 75 and against bias of the pressure spring 13 brings the piston 3 to be displaced in upwards direction, whereby a straightening out of the toggle joint 68c takes place, i.e. a contraction of the expanding portion 68 of the casing. When a new object intended to be held is threaded on until it strikes against the stop fins 83, the valvebody 73 is again moved to the position illustrated in FIG. 6, whereby the pressure on the underside of the piston 3 is discontinued, and the spring 13 urges the arms 68a and 68b to pivot outwards and hold the object that has been threaded on. The device illustrated in the FIGS. 6–8 exhibits very great similarities to the device illustrated in the FIGS. 3–5, and because thereofit is unnecessary to describe it more in detail. The prinicpal difference, however, with respect to the way of function of the holder according to the FIGS. 6–8 is the arrangement that its pressure spring 13 all the time tends to move the device to its active position, while in the device illustrated in the FIGS. 3–5 the pressure spring 13 tends to move the same to its release position. The last one of the examples of embodiment described above exhibits the distinct advantage compared with the other ones that objects threaded on and held continue to be held even in the case that the supply of compressed air should cease, by way of example on account of failure of the equipment.

Moreover the supply of compressed air can be shut off, by way of example at night time, without the holder letting loose its grip on the object in question, which means quite some saving of energy, especially in case of escapes in the supply duct of compressed air, which often occurs in the industry, and at the same time the security is improved.

The invention is not limited to the embodiments described and illustrated in the drawings by way of example only, but can be varied as to its details within the scope of the following claims without therefore departing from the fundamental idea of the invention. In connection with all of the embodiments it is possible to design the casing with several expanding portions distributed along its extension, of which portions the ones located nearest to the free end of the casing, as is shown in FIG. 2, can be arranged to perform a smaller crosswise movement than the other ones.

What I claim is:

1. Device for holding tube-shaped objects comprising a cylinder, a piston slideably mounted in said cylinder, a sleeve shaped-casing surrounding said cylinder, said casing having a fixed portion and a portion slideably mounted on said cylinder, expandable means connecting said casing portions, means connecting said piston to said casing slideable portion, passageways for connecting a pressure medium to at least one side of said piston, sensor means capable of sensing longitudinally directed forces on the object and valve means being connected to said sensor means and capable of controlling the supply of pressure medium to said piston in dependence to the direction of said force acting on the object.

2. Device according to claim 1 including a pressure spring positioned for acting upon one side of said piston opposite to said first mentioned side of said piston.

3. Device according to claim 1 wherein said valve means are operatively connected to said casing portions.

4. Device according to claim 3 wherein said valve means comprises a first valve unit controlling the application of a pressure to said piston when the object is threaded on said casing and a second valve unit controlling the pressure to said piston when the object is taken off said casing.

5. Device according to claim 4, wherein said first valve unit is arranged, when threading an object on said casing, to close an outlet from said cylinder on said other side of said piston, which side is arranged to be in communication with a source of a pressure medium.

6. Device according to claim 5 wherein said first valve unit is provided with an operating handle positioned for being actuated by the object when said object is threaded on said casing.

7. Device according to claim 1 wherein said pressure medium is air.

8. Device according to claim 7 wherein said second valve unit is arranged to open communication between said other side of said piston and the atmosphere.

9. Device according to claim 8 wherein said other valve unit comprises a valve body, a tension spring, a valve seat and said spring tending to hold said valve body against said valve seat in which connection said communication is interrupted at the same time as the communication between the source of pressure medium and the other side of said piston is open.

10. Device according to claim 9 wherein said valve body is arranged to be lifted off said valve seat when the object is removed from said casing.

11. Device according to claim 10 wherein said valve body is fixedly connected to said casing, and said casing is displaceable relative to said valve seat.

12. Device according to claim 1 wherein said expandable means is provided with hinged joints.

13. Device according to claim 12 wherein said hinged joints have friction pads.

14. Device according to claim 12 wherein said expandable means comprises long wall portions spaced apart laterally around the periphery of said casing, which wall portions overbridge the distance between the non-extending portions of said casing.

15. Device according to claim 14 wherein said hinged joints have a comparatively short extension in the longitudinal direction of said casing, while other portions of said expanding parts of said casing are comparatively stiff, whereby in connection with an expansion thereof a toggle-joint-like outwards bending performance is obtained.

16. Device according to claim 1 wherein one of said valve means has a valve body which is moveable relative to said casing, said valve body being arranged in connection with a threading operation and removal of the object on or off said casing, to occupy one of two positions, in one of which pressure by means of said pressure medium is applied to one of the sides of said piston, and in the other of which positions the communication is blocked between the source of the pressure medium and said cylinder on that same side of said piston, in which last mentioned situation the space on said side of said piston is in communication with the atmosphere.

17. Device according to claim 16 including a spring acting on one side of said piston.

18. Device according to claim 17 wherein said fixed casing portion and one of said valve bodies are rigidly mounted on a fixed support.

19. Device according to claim 18 including a channel extending at right angles to the direction of movement of said valve body and opening in its sidewall, said channel communicating with the source of the pressure medium and being arranged in one position of said valve body to communicate with said cylinder on one side of said piston.

20. Device according to claim 19 wherein said valve body has an annular channel in its periphery, which is arranged in the second position of said valve body to bring said cylinder on the side of said piston containing a pressure medium into communication with the atmosphere.

21. Device according to claim 1 wherein said casing has one end provided with centering stops for the object to be held.

22. Device according to claim 21 wherein said stops comprise a plurality of fins projecting from said casing.

23. Device according to claim 17 wherein said spring acts in the expanding direction of said casing.

* * * * *